Sept. 15, 1959     T. W. MULLEN ET AL     2,904,290
MIRROR HINGED SUPPORT
Filed Dec. 16, 1955
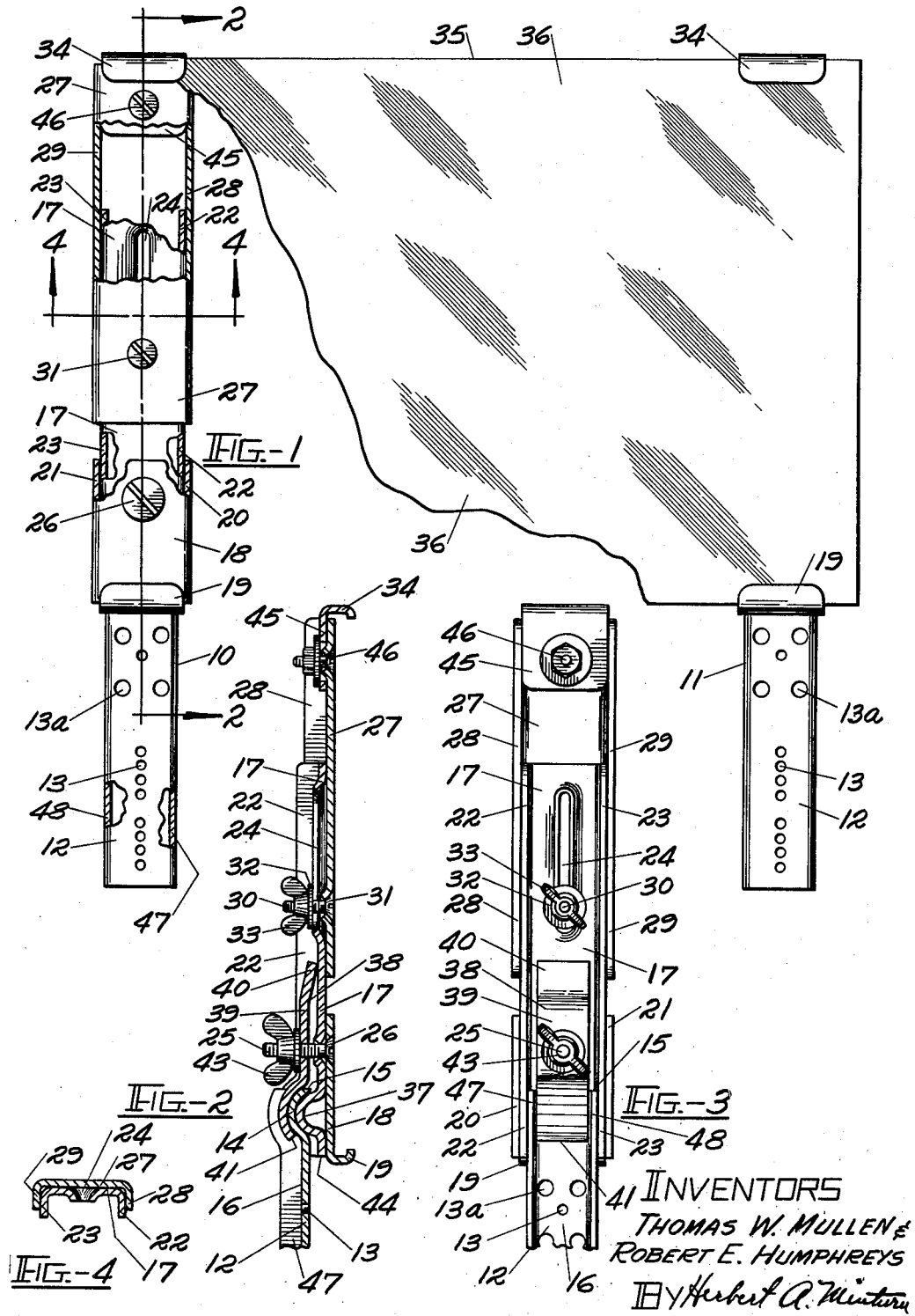
INVENTORS
THOMAS W. MULLEN &
ROBERT E. HUMPHREYS
By Herbert A. Minturn
ATTORNEY 2,904,290
Patented Sept. 15, 1959

2,904,290

MIRROR HINGED SUPPORT

Thomas W. Mullen and Robert E. Humphreys,
Evansville, Ind.

Application December 16, 1955, Serial No. 553,544

12 Claims. (Cl. 248—28)

This invention relates to a structure primarily intended to support a mirror in a hinged manner from the back side of a dresser or vanity table and the like. The structure involves means for gripping mirrors of varying heights, and also for frictionally holding the mirror at different tilted angles as well as in a vertical position. These and many other objects and advantages of the invention, including the extreme simplicity of the structure permitting it to be made at a relatively low cost of production, will become apparent to those versed in the art in the following description of one particular form of the invention as illustrated in the accompanying drawing, in which Fig. 1 is a view in front elevation and partial section of a structure embodying the invention;

Fig. 2 is a vertical section on the line 2—2 in Fig. 1;

Fig. 3 is a detail in rear elevation of means for adjusting the length of the mirror gripping and supporting arm; and Fig. 4 is a detail in section on the line 4—4 in Fig. 1.

A pair of mirror supporting and hinging structures generally designated by the numerals 10 and 11 are required and are identical in size and shapes in their constructions, and therefore a description of the one structure 10 is sufficient to illustrate the like structure embodied in the support 11. There is a substantially flat supporting post 12 herein shown as being a metallic channel member. This post 12 is provided with any suitable means by which it may be attached to the table or dresser (not shown) such as by means of the holes 13 and 13a through which screws may be passed, all in the usual and well known manner. The upper end of the post 12 is formed to have a transversely extending arcuate end portion 14, the end 15 of which terminates substantially in the plane of the back side of the post 12.

A mirror engaging arm 17 likewise herein shown as made out of a channel of metal carries a lower hook-like mirror rest 18. This rest 18 has a lower foot 19 turned outwardly and thence upwardly, slightly from the main body of the rest 18. The rest 18 has the rearwardly turned flanges 20 and 21 which extend along the outer sides of the flanges 22 and 23 of the arm 17. The rest 18 is secured in position near the lower end of the arm 17 by means of a screw or bolt 25 having a head 26 countersunk in the rest 18 and extending through the arm 17 to a distance therebehind.

On the upper end of the arm 17 is carried an extendible member 27. This member 27 has flanges 28 and 29 which extend rearwardly along the flanges 22 and 23 of the arm 17 as indicated in Fig. 1. A bolt 30 is passed through a slot 24 in the arm 17 from a head 31 countersunk in the member 27, Fig. 2, flush with the front side of the member 27 and this bolt extends rearwardly through a washer 32 to receive on its back side a nut herein shown as a wing nut 33 whereby the member 27 may be compressibly urged against the arm 17 by means of the nut 33 so that the member 27 is clamped in vertical position as may be selected along the arm 17 within the length of the slot 24. The flanges 28 and 29 bearing along the flanges 22 and 23 maintain the member 27 against rocking about the bolt 30. The member 27 carries an upper mirror engaging hook 34 which extends forwardly and thence downwardly to receive thereunder the top edge 35 of a mirror 36 which rests across the lower hooks or supports 19. In the present showing this hook 34 is separately attached to the upper end of the member 27 by having a shank 45 extend between the flanges 28 and 29 and receive a bolt 46, extending through the member 27 and the shank 45, to secure it in position with the hook 34 overhanging the member 27 top end, Fig. 2.

The lower end of the arm 17 is formed with a rearwardly extending, arcuate transverse bearing 37. The bearing 37 fits within the forward side of the curved end 14 of the post 12 with a sliding fit.

A retainer 38 has an upper tongue 39 through which the bolt 25 extends. The upper end of the retainer 38 carries a short foot 40 to bear against the back side of the arm 17, Fig. 2. From the lower end of the retainer 38 below the bolt 25, there extends a curved embracingly overlying portion across the entire width of the end 14 to follow therearound in a curving manner and terminating by an end 41 to define a circumferential length less than half of a cylinder. The curved portion of the retainer is spaced from the arm 17 whereby the wing nut 43 engaging the bolt 25 may be drawn up to bring the foot 40 against the arm 17 and bring its end portion 41 against the back side of the curved end 14. The degree of compression of the foot 40 of the member 38, set up by the bolt 25 and nut 43 as just indicated, against the arm 17 and the curved portion 14 will determine the force necessary to effect rocking the mirror 36 since the curved portion 14 is thus compressively and frictionally gripped between the retainer end portion 41 and the member 37.

The degree of rocking of the mirror 36 will of course be limited, but there is sufficient travel permitted to rock the mirror 36 rearwardly or forwardly to desired and usable positions.

Therefore, this limitation of mirror rocking is had by the end 41 striking the face 16 in the rearward rocking and the lower end 44 of the arm 17 striking the front face of the supporting post 12 in the forward rocking travel. The side flanges 22 and 23 extend along the side flanges 47 and 48 of the post 12 throughout on curved portions 37 and 14 respectively to give rigidity. It is to be seen that we have provided an extremely simple but quite effective structure for the purposes indicated, and while we have herein shown the invention in the one particular form, it is obvious that structural changes may be employed without departing from the spirit of the invention, and we therefore do not desire to be limited to that precise form beyond the limitations which may be imposed by the following claims.

We claim:

1. A hinged mirror support comprising a pair of posts; a transversely extending arcuate upper end portion on each post; a pair of mirror carrying arms each having a transversely extending arcuate lower end portion bearing within said post arcuate portions; clamp members, one each bearing by an end portion against said arms and extending by a transversely disposed arcuate portion around outside of and against the said post arcuate portions; means variably urging said clamp members toward said arms compressibly urging said arm and post arcuate portions one against the other to the desired degree of frictional resistance to sliding movement therebetween; each of said arms having side flanges between which said clamps lie and are retained against sidewise travel; and said urging means comprises a bolt in each instance extending through said arms and said clamp members.

2. A friction position retaining, hinged mirror support comprising a post having a channel section with side flanges and an intervening web; a transversely extending arcuate end portion on said post extending between said flanges; a mirror carrying arm having a channel section with side flanges and an intervening web; a transversely extending arcuate portion on an end of said arm receiving therearound said post arcuate portion; said post flanges extending around the ends of the post arcuate portion and fitting slidingly between the flanges of said arm; a clamp member lying between said post and arm flanges and having a transversely extending arcuate section end portion engaging around said post arcuate portion and bearing by an opposite end on said arm; and bolt means passing through said clamp member intermediate its said opposite end and its arcuate portion and passing through said arm at a zone removed from its arcuate portion; said bolt means variably urging said clamp member arcuate portion against said post arcuate portion in turn urged against said arm arcuate portion for the desired degree of frictional resistance to travel of said arm portion around said post portion.

3. The structure of claim 2 in which said clamp member has a length intermediate its said opposite end and its said arcuate portion spaced from the web of said arm retaining said intermediate length free of contact with said arm web.

4. A hinged mirror support comprising a post; a transversely extending arcuate upper end portion on the post; a mirror carrying arm; a transversely extending arcuate lower end portion bearing within the arcuate portion of said post; a clamp member bearing by an end portion against said arm removed from said arcuate portions and extending by a transversely disposed arcuate portion around, outside of, and against said post arcuate portion; means comprising a bolt extending through said arm and said clamp end portion variably urging said clamp member toward said arm and compressibly urging said arm and the arcuate portions of said post one against the other to the desired degree of frictional resistance to sliding movement therebetween.

5. A hinged mirror support comprising a post; a transversely extending arcuate upper end portion on the post; a mirror carrying arm; a transversely extending arcuate lower end portion bearing within said post arcuate portion; a clamp member bearing by an end portion against said arm removed from said arcuate portions and extending by a transversely disposed arcuate portion around, outside of, and against said post arcuate portion; means comprising a bolt extending through said arm and said clamp end portion variably urging said clamp member toward said arm and compressibly urging said arm and post arcuate portions one against the other to the desired degree of frictional resistance to sliding movement therebetween.

6. A hinged support for a mirror comprising a first substantially flat member for attachment to a base and a second substantially flat member for attachment to a mirror to be supported, one of said members having an arcuate end portion and the other having a similarly disposed cooperating end portion for complementary engagement therewith and providing a transverse hinge between said members, clamping means connected to one of said members and disposed closely adjacent to and overlying and in contact with a substantial area of the surface of said arcuate end and cooperating portions for urging said members in frictional engagement permitting slight angular adjustment of the members but sufficient to maintain them in fixed adjusted position, said arcuate end and cooperating portions and said clamping means being constructed and arranged to limit the angular movement of said transverse hinge.

7. The structure of claim 6 in which said substantially flat members are channel shaped and the end of one is snugly received within the cooperating end portion of the other.

8. The structure of claim 6 in which said substantially flat members have angular flanges reinforcing said hinge.

9. The structure of claim 6 in which at least a portion of said substantially flat members is channel shaped and with the flanges of the channel shaped members providing spaced reinforcement for said transverse hinge.

10. The structure of claim 6 in which said clamping means has a portion bearing against one of said arcuate end and cooperating portions of said substantially flat members and a remote portion bearing against the other of said substantially flat members and with means fastening the intermediate portion of said clamp to the adjacent substantially flat member.

11. The structure of claim 6 in which at least one of the substantially flat members is provided with flange means where the members are in complementary engagement, said flange means being transverse to the axis of said arcuate portion and being in engagement with the other member thereby restricting the angular adjustment of the hinge to movement about the axis of said arcuate portion.

12. The structure of claim 6 in which said clamping means includes a third member having an arcuate portion nesting snugly against said arcuate end portion of said one member and means connecting said third member to said other member and preventing relative movement between said third member and said other member while urging said third member toward said one member.

References Cited in the file of this patent

UNITED STATES PATENTS

| | | |
|---|---|---|
| 738,812 | Johnston | Sept. 15, 1903 |
| 1,338,781 | Levy | May 4, 1920 |
| 1,861,148 | Withrow | May 31, 1932 |
| 2,313,532 | Garrett | Mar. 9, 1943 |
| 2,335,896 | Anderson | Dec. 7, 1943 |
| 2,603,394 | Beck | July 15, 1952 |